(12) United States Patent
Tan et al.

(10) Patent No.: US 12,060,664 B2
(45) Date of Patent: Aug. 13, 2024

(54) METHOD AND APPARATUS FOR CUSTOMIZING KNITTED PRODUCTS

(71) Applicant: Shanghai Cimpress Technology Company Limited, Shanghai (CN)

(72) Inventors: Jinhua Tan, Shanghai (CN); Livio Rodari, Shanghai (CN); Kexia Sun, Shanghai (CN)

(73) Assignee: Shanghai Cimpress Technology Company Limited, Shanghai (CN)

( * ) Notice: Subject to any disclaimer, the term of this patent is extended or adjusted under 35 U.S.C. 154(b) by 428 days.

(21) Appl. No.: 17/522,400

(22) Filed: Nov. 9, 2021

(65) Prior Publication Data
US 2023/0147207 A1 May 11, 2023

(51) Int. Cl.
*D04B 15/66* (2006.01)
*G05B 19/4097* (2006.01)
*G06F 30/12* (2020.01)
*G06F 113/12* (2020.01)
*G06Q 30/0601* (2023.01)

(52) U.S. Cl.
CPC ......... *D04B 15/66* (2013.01); *G05B 19/4097* (2013.01); *G05B 2219/35012* (2013.01); *G05B 2219/45194* (2013.01); *G06F 30/12* (2020.01); *G06F 2113/12* (2020.01); *G06Q 30/0621* (2013.01); *G06Q 30/0643* (2013.01)

(58) Field of Classification Search
CPC ........ D04B 15/66; D04B 15/70; D04B 15/78; G05B 19/4097; G05B 2219/45194
See application file for complete search history.

(56) References Cited

U.S. PATENT DOCUMENTS

| | | | | |
|---|---|---|---|---|
| 7,272,462 B2* | 9/2007 | Smedley | ............... | D04B 37/02 700/141 |
| 7,657,341 B2* | 2/2010 | Lind | ....................... | D04B 1/22 700/131 |
| 7,664,564 B2* | 2/2010 | Kawasaki | .............. | D04B 1/246 700/141 |

(Continued)

FOREIGN PATENT DOCUMENTS

| | | | | |
|---|---|---|---|---|
| CN | 113077207 A | * | 7/2021 | ......... G06Q 10/0631 |
| WO | WO-2009113282 A1 | * | 9/2009 | ............. D04B 37/02 |

(Continued)

*Primary Examiner* — Danny Worrell
(74) *Attorney, Agent, or Firm* — Emerson, Thomson, & Bennett, LLC; Roger D. Emerson; Matt J. Wilson (57) ABSTRACT

Embodiments of the present disclosure disclose a method and apparatus for customizing knitted products. A specific embodiment of the method includes: receiving knitting program instructions of basic products uploaded regularly by factories to a cloud-based customization platform; generating a design file and an order of a new product in response to a customer designing the new product on the cloud-based customization platform and placing the order; replacing the design file of the corresponding basic product with the design file of the new product to generate the knitting program for making the new product, and generating a working file executable by a knitting machine; sending the order and the working file to an intelligent factory system or manufacturing execution system; and producing the new product by using the knitting machine according to the working file.

15 Claims, 2 Drawing Sheets

(56) References Cited

U.S. PATENT DOCUMENTS

| | | | |
|---|---|---|---|
| 8,506,303 B1* | 8/2013 | Smith | G09B 19/20 |
| | | | 434/95 |
| 11,293,124 B2* | 4/2022 | Morgan | G05B 19/4097 |
| 11,366,453 B2* | 6/2022 | Alun-Jones | G06Q 30/0601 |
| 11,421,355 B2* | 8/2022 | Karmon | D04B 37/00 |
| 11,748,795 B2* | 9/2023 | Dhana | G06F 3/0486 |
| | | | 705/26.5 |
| 11,913,149 B2* | 2/2024 | Karmon | D04B 37/00 |
| 2009/0082898 A1* | 3/2009 | Terai | G06F 30/20 |
| | | | 66/232 |
| 2019/0026395 A1* | 1/2019 | Barnes | G06Q 30/0621 |
| 2019/0382931 A1* | 12/2019 | Karmon | D04B 37/00 |
| 2020/0293024 A1* | 9/2020 | Pail | G05B 19/4097 |
| 2023/0147207 A1* | 5/2023 | Tan | D04B 15/66 |
| | | | 705/26.5 |

FOREIGN PATENT DOCUMENTS

| | | | | |
|---|---|---|---|---|
| WO | WO-2019112628 A1 * | 6/2019 | | D04B 1/22 |
| WO | WO-2022193377 A1 * | 9/2022 | | G06Q 10/0631 |

* cited by examiner

METHOD AND APPARATUS FOR CUSTOMIZING KNITTED PRODUCTS

TECHNICAL FIELD

This disclosure relates to the field of knitted products, specifically to a method and apparatus for customizing knitted products.

BACKGROUND

The current production flow for knitted products includes the following steps: 1) designing a style by a designer; 2) delivering the design drawing to a technician for making knitting program; and 3) producing on the machine. Customized orders have numerous styles but small quantity, so it takes time for factories to make programs and debug machines before production, which greatly reduce the production efficiency. Most of the factories, in order to improve the efficiency, provide service only for customers with less style requirement and a large quantity. Therefore, some customers with customization requirement for a small quantity can hardly find factories to produce. Meanwhile, knitting machines of some factories are idled since no order is received, and the income of the factories is reduced.

SUMMARY

The disclosure provides a method for customizing knitted products in which the knitting program instructions of basic products uploaded to the cloud-based customization platform are taken as a template to perform replacement and adjustment, thereby quickly generating the knitting program of a new product and forming a working file executable by a knitting machine. The production cost of customized products is reduced and the production efficiency of customized products is increased.

This disclosure provides a method for customizing knitted products, including: receiving knitting program instructions of basic products uploaded regularly by factories to a cloud-based customization platform, the knitting program instructions of basic products including design files of the basic products and knitting programs for making the basic products; generating a design file and an order of a new product in response to a customer designing the new product on the cloud-based customization platform based on the basic products and placing the order; replacing the design file of the corresponding basic product with the design file of the new product to generate the knitting program for making the new product, and generating a working file executable by a knitting machine; sending the order and the working file to an intelligent factory system or manufacturing execution system thereby transmitting the order and the working file to the knitting machine of a corresponding factory; and producing the new product by using the knitting machine according to the working file.

In some embodiments, the cloud-based customization platform is a website or App, on which the customer browses designs of the basic products, and designs the new product based on the basic products without changing the style number.

In some embodiments, the generating a design file and an order of a new product includes: adjusting a size of an image uploaded by the customer and positioning the image in a predefined image field in the design of the basic product in web environment by using a computer-aided design system, including: ascertaining whether the image will be cut when incorporated into the design; and if yes, adjusting the size of the image and cutting the image to create a version of the image to be filled in the image field; if not, adjusting the size of the image to suit the image field and positioning the image in the image field according to a predefined anchor position with the original aspect ratio maintained.

In some embodiments, the method further includes: showing the customer a product preview through a rendering system, and inserting the product preview into a rendered animation scene to depict the new product designed by the customer under different lighting angles. The rendered animation scene will use the real image (i.e., photo) of product texture (e.g., knitting, embroidery) in the product area, which is helpful to accurately render and depict the natural appearance of the product when light passes through the product in different angles. Since the appearance of the texture is natural and accurate, the simulated depiction of the product enables a more realistic perception of the appearance of the final product, thus improving customer satisfaction by matching the customer perception with the delivered actual product.

In some embodiments, the working file is sent to the corresponding knitting machine via network; the knitting machines are all equipped with a network interface; and each of the knitting machines has an IP address.

In some embodiments, the generating an order of a new product includes: receiving a quantity of the new product and recipient's contact information filled by the customer.

In some embodiment, the method includes delivering the new product to the customer, including: delivering the new product from the factory to the customer by using the intelligent factory system or manufacturing execution system, receiving updated logistic information from the intelligent factory system or manufacturing execution system so that the customer can trace the logistic information timely on the cloud-based customization platform.

In some embodiment, the intelligent factory system or manufacturing execution system automatically dispatches and creates a production team, and stores the order and corresponding work and production parameters electronically in a database of pending work. Before the commencement of preset production time of each production team, the corresponding work of each production team is selected from the database. Then the corresponding work of each production team will be assigned to the production line and transferred to the corresponding machine for production.

In some embodiment, the design file includes style information, size information, and a knitting structure.

In some embodiment, the style information includes pattern and text information.

In some embodiment, the size information includes a lateral size and a longitudinal size; the lateral size is not arbitrary, the lateral pixels are consistent with the number of knitting needles on the knitting machine; and the longitudinal size is arbitrarily designed based on a length of the product.

In some embodiment, the knitting structure is indicated by color; the color represents a needle selection command on the knitting machine; and different needle selection commands can form different knitted fabric effects.

In some embodiment, the knitting program includes action commands of each circle when the knitting machine is knitting the basic product.

In some embodiment, the action commands include action commands of yarn nozzle, yarn feeder, cam, and density motor required for knitting the basic products.

In some embodiment, the replacing the design file of the corresponding basic product with the design file of the new product to generate the knitting program for making the new product, and generating a working file executable by a knitting machine includes: transmitting the design file of the new product to a knitting program generation tool; calling, by the knitting program generation tool, the knitting program instruction of the basic product corresponding to the new product in the cloud-based customization platform; matching the design file of the new product with the knitting program instruction of the corresponding basic product; and replacing the design file in the knitting program instruction of the basic product with the design file of the new product to generate the knitting program for making the new product, and generating the working file executable by the knitting machine.

In some embodiment, the matching the design file of the new product with the knitting program instruction of the corresponding basic product includes:

ascertaining whether size information in the design file of the new product meets a requirement for size information in the design file of the corresponding basic product;

ascertaining whether a knitting structure in the design file of the new product meets a requirement for knitting structure in the design file of the corresponding basic product;

if all the requirements are met, the design file of the new product and the knitting program instruction of the corresponding basic product match; otherwise, informing the customer to modify the design of the new product.

In some embodiment, the ascertaining whether size information in the design file of the new product meets a requirement for size information in the design file of the corresponding basic product includes: ascertaining whether a lateral size in the design file of the new product is identical with the design file of the corresponding basic product; if yes, the requirement for size information is met; and replacing a longitudinal size in the design file of the corresponding basic product with the longitudinal size in the design file of the new product in response to determining that the longitudinal size in the design file of the new product is not identical with the longitudinal size in the design file of the corresponding basic product.

The ascertaining whether a knitting structure in the design file of the new product meets a requirement for knitting structure in the design file of the corresponding basic product includes: ascertaining whether the knitting structure in the design file of the new product can be recognized and used colors are correct; if yes, the requirement for knitting structure is met.

In some embodiment, the disclosure relates to an apparatus for customizing knitted products, the apparatus including at least one processor and a memory storing instructions, the instructions when executed by the at least one processor, cause the at least one professor to perform the mentioned method of the disclosure.

In a second aspect, the embodiments of the present disclosure provide an apparatus for customizing knitted products, the apparatus including: at least one processor; and a memory storing instructions, the instructions when executed by the at least one processor, cause the at least one processor to perform operations, the operations including: receiving knitting program instructions of basic products uploaded regularly by factories to a cloud-based customization platform, the knitting program instructions of basic products comprising design files of the basic products and knitting programs for making the basic products; generating a design file and an order of a new product in response to a customer designing the new product on the cloud-based customization platform based on the basic products and placing the order; replacing the design file of the corresponding basic product with the design file of the new product to generate the knitting program for making the new product, and generating a working file executable by a knitting machine; sending the order and the working file to an intelligent factory system or manufacturing execution system thereby transmitting the order and the working file to the knitting machine of a corresponding factory; and producing the new product by using the knitting machine according to the working file.

In a third aspect, the embodiments of the present disclosure provide a non-transitory computer readable storage medium, storing a computer program thereon, the program, when executed by a processor, implements the method according to any one of the embodiments in the first aspect.

The disclosure proposes a method and apparatus for customizing knitted products, which coordinates different knitting machines from different factories based on the cloud-based customization platform. The intelligent factory system or manufacturing execution system allocates the order rationally according to the predefined rule. The knitting program instructions of basic products uploaded to the cloud-based customization platform are used as template, based on which replacements and adjustments are conducted, thereby quickly generating the knitting program for making the new product and forming a working file executable by a knitting machine. Therefore, the generation steps, time, and cost of the knitting program for making new products are reduced, and the production efficiency of customized products is increased without increasing production cost.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

Figure 1:
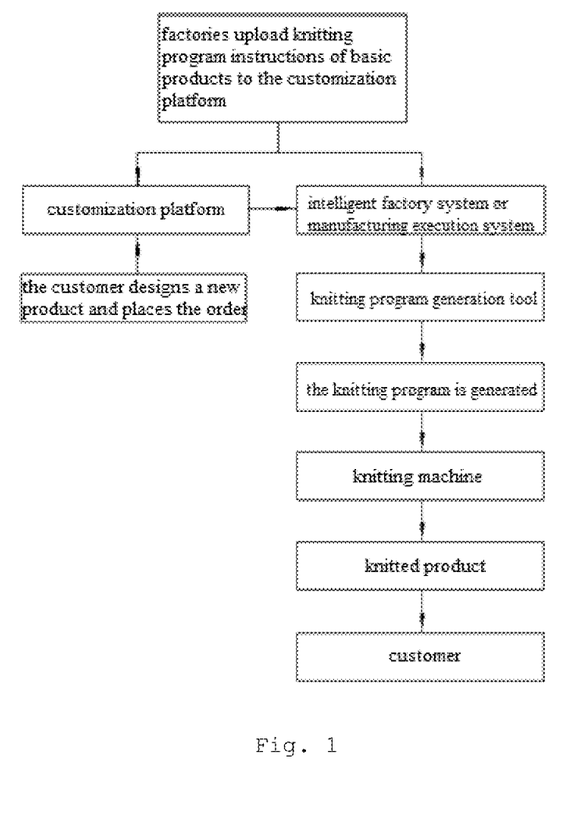
FIG. 1 is a schematic diagram of an application scenario of the method for customizing knitted products.

With further reference to FIG. 1, a flow of an embodiment of the method for customizing knitted products according to the present disclosure is illustrated. The flow of the method for customizing knitted products includes the following steps:

Receiving knitting program instructions of basic products uploaded regularly by factories to a cloud-based customization platform, the knitting program instructions of basic products including design files of the basic products and knitting programs for making the basic products;

Generating a design file and an order of a new product in response to a customer designing the new product on the cloud-based customization platform based on the basic products and placing the order;

Replacing the design file of the corresponding basic product with the design file of the new product to generate the knitting program for making the new product, and generating a working file executable by a knitting machine;

Sending the order and the working file to an intelligent factory system or manufacturing execution system thereby transmitting the order and the working file to the knitting machine of a corresponding factory; and Producing the new product by using the knitting machine according to the working file.

In the present embodiment, the cloud-based customization platform is a website or App, on which the customer browses designs of the basic products, and designs the new product based on the basic products without changing the style number.

In addition, the generating a design file and an order of a new product includes:

Adjusting a size of an image uploaded by the customer and positioning the image in a predefined image field in the design of the basic product in web environment by using a computer-aided design system, including:

Ascertaining whether the image will be cut when incorporated into the design; and If yes, adjusting the size of the image and cutting the image to create a version of the image to be filled in the image field; if not, adjusting the size of the image to suit the image field and positioning the image in the image field according to a predefined anchor position with the original aspect ratio maintained.

In some alternative implementations of the present embodiment, the cloud-based customization platform shows the customer a product preview through a rendering system, and inserts the product preview into a rendered animation scene to depict the new product designed by the customer under different lighting angles. The rendered animation scene will use the real image (i.e., photo) of product texture (e.g., knitting, embroidery, etc.) in the product area, which is helpful to accurately render and depict the natural appearance of the product when light passes through the product in different angles. Since the appearance of the texture is natural and accurate, the simulated depiction of the product enables a more realistic perception of the appearance of the final product, thus improving customer satisfaction by matching the customer perception with the delivered actual product.

In some alternative implementations of the present embodiment, the working file is sent to the corresponding knitting machine via network; the knitting machines are all equipped with a network interface; and each of the knitting machines has an IP address.

In some alternative implementations of the present embodiment, the generating an order of a new product includes: receiving a quantity of the new product and recipient's contact information filled by the customer; and In some alternative implementations of the present embodiment, the method includes delivering the new product to the customer, including: delivering the new product from the factory to the customer by using the intelligent factory system or manufacturing execution system, receiving updated logistic information from the intelligent factory system or manufacturing execution system so that the customer can trace the logistic information timely on the cloud-based customization platform.

In some alternative implementations of the present embodiment, the intelligent factory system or manufacturing execution system automatically dispatches and creates a production team, and stores the order and corresponding work and production parameters electronically in a database of pending work. Before the commencement of preset production time of each production team, corresponding work of each production team is selected from the database, then the corresponding work of each production team will be assigned to the production line and transferred to corresponding machines for production.

Figure 2:
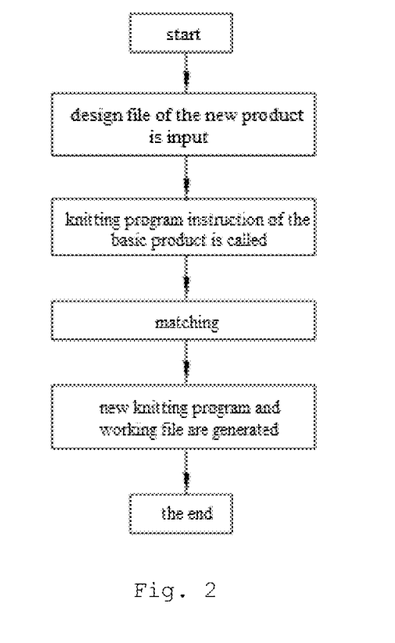
FIG. 2 is a schematic diagram of an application scenario of the step for generating the knitting program of the new product.

In some alternative implementations of the present embodiment, the replacing the design file of the corresponding basic product with the design file of the new product to generate the knitting program for making the new product, and generating a working file executable by a knitting machine includes:

Transmitting the design file of the new product to a knitting program generation tool;

Calling, by the knitting program generation tool, the knitting program instruction of the basic product corresponding to the new product in the cloud-based customization platform;

Matching the design file of the new product with the knitting program instruction of the corresponding basic product; and Replacing the design file in the knitting program instruction of the basic product with the design file of the new product to generate the knitting program for making the new product, and generating the working file executable by the knitting machine.

The knitting program generation tool calls the knitting program instruction of the basic product from the cloud-based customization system, modifies the design file (DIS file) in the knitting program of the basic product, and transmits the design file (BMP file) of the new product to the knitting program generation tool.

The knitting program generation tool automatically detects the design file of the new product and ascertain whether the size (lateral) and color in the design file meet the requirements.

If all the requirements are met, a new knitting program is automatically generated, and then a new working file is generated, which is transmitted to the knitting machine for production; otherwise, informing the customer to modify the design of the new product again.

The steps for generating the knitting program of the new product in the disclosure is detailed described below:

Step a: inputting the design file of the new product.

A design file includes style information, size information, and a knitting structure of the product.

The style information includes pattern and text information.

The size information includes a lateral size and a longitudinal size.

The lateral size is not arbitrary, and the lateral pixels are consistent with the number of knitting needles to be used on the knitting machine.

The longitudinal size is arbitrarily designed based on the length of the product.

The knitting structure is indicated by colors.

A color in the design file represents a needle selection command on the knitting machine. Different colors represent different needle selection commands.

Different needle selection commands can form different knitted fabric effects.

In some alternative implementations of the present embodiment, colors for seamless underwear machine and hosiery machine are different.

The design file can be generated from graphics software.

The graphics software can be Adobe Illustrator, which is commonly known as "AI," a software for vector-based illustration used in publication, multimedia, and online images.

In some alternative implementations of the present embodiment, the design file can be BMP file or PNG file.

Step b: calling the knitting program instruction of the basic product from the cloud-based customization platform.

The knitting program instruction of the basic product includes design file of the basic product and the knitting program for making the basic product.

The knitting program instruction of the basic product can be obtained from a general programming software. Existing knitting program instructions can be obtained by setting an API interface with the general programming software.

The knitting program includes action commands of each circle when the knitting machine is knitting products, such as making clothes.

In some alternative implementations of the present embodiment, the action commands include action commands of yarn nozzle, yarn feeder, cam, and density motor required for knitting the basic products.

In some alternative implementations of the present embodiment, knitting programs are edited in Digraph 3 plus.

In some embodiments, by setting an API interface with existing Digraph 3 plus software, knitting programs already completed in Digraph 3 plus can be called as a template.

Step c: Matching.

The matching the design file of the new product with the knitting program instruction of the corresponding basic product further includes:

Ascertaining whether the size information in the design file of the new product meets the requirement;

Ascertaining whether the knitting structure in the design file of the new product meets the requirement.

In some alternative implementations of the present embodiment, the matching further includes ascertaining whether the lateral size in the design file of the new product is consistent with the lateral size in the design file of the corresponding basic product, while the longitudinal size has no requirement.

In some alternative implementations of the present embodiment, the matching further includes ascertaining whether the knitting structure in the design file of the new product can be recognized, i.e., whether the used colors are correct.

If the design file of the new product meets the above-mentioned requirements, the design file of the new product and the knitting program instruction of the basic product match, and step d is executed. The design file of the new product automatically replace the design file in the knitting program instructions of the corresponding basic product.

Otherwise, the cloud-based customization platform informs the customer to modify the design file of the new product and return to step a.

Taking the case that the design file is a pattern file as an example, the design file of the corresponding basic product is a template, which contains one or more pattern files for different parts of clothing (sweep, body, etc.). Different pattern files in the template are numbered as pattern1, pattern2, and pattern3.

When the customer designs the new product, he can design the pattern for the part to be customized and name the designed pattern files as pattern1, pattern2, and pattern3, which will be used to match and replace the pattern files of the basic product.

Step d: generating a new knitting program instruction.

The design file in the knitting program of the basic product in step b is replaced with the design file of the new product.

If the longitudinal size in the design file of the new product is not identical with the longitudinal size in the design file of the corresponding basic product, the longitudinal size in the design file of the corresponding basic product is replaced with the longitudinal size in the design file of the new product.

Taking the case that the design file is a pattern file as an example, after matching, the pattern files in the template is replaced with those in the design file of the new product. The names of the pattern files in the template and the names of the pattern files in the design file of the new product is compared, and the pattern files to be replaced are determined. After the replacement of the pattern files, new program will be generated automatically. The customer can click the code button and generate a working file executable by a knitting machine.

If the length in the design file of the new product does not match the design file in the template, the length in the design file of the basic product of step b is automatically adjusted.

According to the method and system of the present disclosure, the design file of a new product can be generated by modifying the knitting structure, characters, patterns etc. of a basic product. The existing knitting program can be automatically replaced, and the working file corresponding to the new design file is generated, thereby a knitting machine can make the new product. The automatic design method and system are simple to operate, have strong operability and high efficiency.

Figure 3:
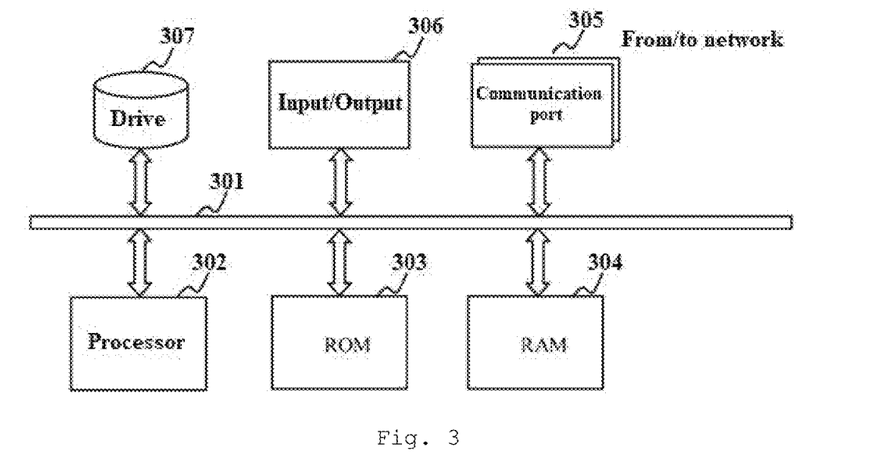
FIG. 3 is a schematic structural diagram of a computer system adapted to implement an apparatus of the embodiments of the present disclosure.

Referring to FIG. 3, a schematic structural diagram of a computer system 300 adapted to implement an electronic device of the embodiments of the present application is shown. The electronic device shown in FIG. 3 is merely an example and should not impose any restriction on the function and scope of use of the embodiments of the present application.

As shown in FIG. 3, the computer system 300 includes a central processing unit (CPU) 302, which may execute various appropriate actions and processes in accordance with a program stored in a read-only memory (ROM) 303 or a program loaded into a random-access memory (RAM) 304 from a storage portion. The RAM 304 also stores various programs and data required by operations of the system 300. The CPU 302, the ROM 303 and the RAM 304 are connected to each other through a bus 301. An input/output (I/O) interface 306 is also connected to the bus 301.

The following components are connected to the I/O interface 306: an input portion including a keyboard, a mouse etc.; an output portion comprising a cathode ray tube (CRT), a liquid crystal display device (LCD), a speaker etc.; a storage portion including a hard disk and the like; and a communication portion 305 comprising a network interface card, such as a LAN card and a modem. The communication portion 305 performs communication processes via a network, such as the Internet. A drive 307 is also connected to the I/O interface 306 as required. A removable medium, such as a magnetic disk, an optical disk, a magneto-optical disk, and a semiconductor memory, may be installed on the drive 307, to facilitate the retrieval of a computer program from the removable medium, and the installation thereof on the storage portion as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication port 305, and/or may be installed from the removable media. The computer program, when executed by the central processing unit (CPU) 302, implements the above-mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random-access memory (RAM), a read only memory (ROM), an erasable programmable read only memory (EPROM or flash memory), an optical fiber, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, including a receiving unit, a generation unit, a replacing unit, a sending unit, and a producing unit, where the names of these units or modules do not in some cases constitute a limitation to such units or modules themselves. For example, the receiving unit may also be described as "a unit for receiving knitting program instructions of basic products."

In another aspect, the present disclosure further provides a non-transitory computer-readable storage medium. The non-transitory computer-readable storage medium may be the non-transitory computer-readable storage medium included in the apparatus in the above-described embodiments, or a stand-alone non-transitory computer-readable storage medium not assembled into the apparatus. The non-transitory computer-readable storage medium stores one or more programs. The one or more programs, when executed by a device, cause the device to: receive knitting program instructions of basic products uploaded regularly by factories to a cloud-based customization platform, the knitting program instructions of basic products comprising design files of the basic products and knitting programs for making the basic products; generate a design file and an order of a new product in response to a customer designing the new product on the cloud-based customization platform based on the basic products and placing the order; replace the design file of the corresponding basic product with the design file of the new product to generate the knitting program for making the new product, and generating a working file executable by a knitting machine; send the order and the working file to an intelligent factory system or manufacturing execution system thereby transmitting the order and the working file to the knitting machine of a corresponding factory; and produce the new product by using the knitting machine according to the working file.

The above description only provides an explanation of the preferred embodiments of the present disclosure and the technical principles used. It should be appreciated by one of ordinary skill in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for customizing knitted products, comprising:
   receiving knitting program instructions of basic products uploaded regularly by factories to a cloud-based customization platform, the knitting program instructions of basic products comprising design files of the basic products and knitting programs for making the basic products;
   generating a design file and an order of a new product in response to a customer designing the new product on the cloud-based customization platform based on the basic products and placing the order;
   replacing the design file of the corresponding basic product with the design file of the new product to generate the knitting program for making the new product, and generating a working file executable by a knitting machine;

sending the order and the working file to an intelligent factory system or manufacturing execution system thereby transmitting the order and the working file to the knitting machine of a corresponding factory;

producing the new product by using the knitting machine according to the working file;

wherein, the design file includes size information, and a knitting structure;

the size information includes a lateral size and a longitudinal size; the lateral size is not arbitrary, and lateral pixels are consistent with a number of knitting needles to be used on the knitting machine; the longitudinal size is arbitrarily designed based on a length of the product; and the knitting structure is indicated by color, the color represents a needle selection command on the knitting machine, and different needle selection commands form different knitted fabric effect.

2. The method according to claim 1, wherein the cloud-based customization platform is a website or App, on which the customer browses designs of the basic products, and designs the new product based on the basic products without changing the style number.

3. The method according to claim 2, wherein the generating a design file and an order of a new product comprises:

adjusting a size of an image uploaded by the customer and positioning the image in a predefined image field in the design of the basic product in Web environment by using a computer-aided design system, comprising:

ascertaining whether the image will be cut when incorporated into the design; and if yes, adjusting the size of the image and cutting the image to create a version of the image to be filled in the image field; if not, adjusting the size of the image to suit the image field and positioning the image in the image field according to a predefined anchor position with an original aspect ratio maintained.

4. The method according to claim 2, further comprising:

showing the customer a product preview through a rendering system, and inserting the product preview into a rendered animation scene to depict the new product designed by the customer under different lighting angles.

5. The method according to claim 1, wherein the working file is sent to the corresponding knitting machine via network; the knitting machines are all equipped with a network interface; and each of the knitting machines has an IP address.

6. The method according to claim 1, wherein the generating an order of a new product comprises:

receiving a quantity of the new product and recipient's contact information filled by the customer; and the method further comprises:

delivering the new product to the customer, comprising:

delivering the new product from the factory to the customer by using the intelligent factory system or manufacturing execution system, receiving updated logistic information from the intelligent factory system or manufacturing execution system so that the customer can trace the logistic information timely on the cloud-based customization platform.

7. The method according to claim 1, wherein the intelligent factory system or manufacturing execution system automatically dispatches and creates a production team, and stores the order and corresponding work and production parameters electronically in a database of pending work.

8. The method according to claim 1, wherein the design file further includes style information.

9. The method according to claim 8, wherein
the style information includes pattern and text information.

10. The method according to claim 1, wherein the knitting program includes action commands of each of a circle when the knitting machine is knitting the basic products; and the action commands comprise action commands of yarn nozzle, yarn feeder, cam, and density motor required for knitting the basic products.

11. The method according to claim 1, wherein the replacing the design file of the corresponding basic product with the design file of the new product to generate the knitting program for making the new product, and generating a working file executable by a knitting machine comprises:

transmitting the design file of the new product to a knitting program generation tool;

calling, by the knitting program generation tool, the knitting program instruction of the basic product corresponding to the new product in the cloud-based customization platform;

matching the design file of the new product with the knitting program instruction of the corresponding basic product;

replacing the design file in the knitting program instruction of the corresponding basic product with the design file of the new product to generate the knitting program for making the new product, and generating the working file executable by the knitting machine.

12. The method according to claim 11, wherein the matching the design file of the new product with the knitting program instruction of the corresponding basic product comprises:

ascertaining whether size information in the design file of the new product meets a requirement for size information in the design file of the corresponding basic product;

ascertaining whether a knitting structure in the design file of the new product meets a requirement for knitting structure in the design file of the corresponding basic product;

if all the requirements are met, the design file of the new product and the knitting program instruction of the corresponding basic product match; otherwise, informing the customer to modify a design of the new product.

13. The method according to claim 12, wherein the ascertaining whether size information in the design file of the new product meets a requirement for size information in the design file of the corresponding basic product comprises:

ascertaining whether a lateral size in the design file of the new product is identical with the lateral size in the design file of the corresponding basic product; if yes, the requirement for size information is met; and replacing a longitudinal size in the design file of the corresponding basic product with the longitudinal size in the design file of the new product in response to determining that the longitudinal size in the design file of the new product is not identical with the longitudinal size in the design file of the corresponding basic product, and the ascertaining whether a knitting structure in the design file of the new product meets a requirement for knitting structure in the design file of the corresponding basic product comprises:

ascertaining whether the knitting structure in the design file of the new product can be recognized and used colors are correct; if yes, the requirement for knitting structure is met.

14. An apparatus for customizing knitted products, the apparatus comprising:
at least one processor; and
a memory storing instructions, the instructions when executed by the at least one processor, cause the at least one processor to perform operations, the operations comprising:
receiving knitting program instructions of basic products uploaded regularly by factories to a cloud-based customization platform, the knitting program instructions of basic products comprising design files of the basic products and knitting programs for making the basic products;
generating a design file and an order of a new product in response to a customer designing the new product on the cloud-based customization platform based on the basic products and placing the order;
replacing the design file of the corresponding basic product with the design file of the new product to generate the knitting program for making the new product, and generating a working file executable by a knitting machine;
sending the order and the working file to an intelligent factory system or manufacturing execution system thereby transmitting the order and the working file to the knitting machine of a corresponding factory;
producing the new product by using the knitting machine according to the working file;
wherein, the design file includes size information, and a knitting structure;
the size information includes a lateral size and a longitudinal size; the lateral size is not arbitrary, and lateral pixels are consistent with a number of knitting needles to be used on the knitting machine; the longitudinal size is arbitrarily designed based on a length of the product; and
the knitting structure is indicated by color, the color represents a needle selection command on the knitting machine, and different needle selection commands form different knitted fabric effect.

15. A non-transitory computer storage medium storing a computer program, the computer program when executed by one or more processors, causes the one or more processors to perform operations, the operations comprising:
receiving knitting program instructions of basic products uploaded regularly by factories to a cloud-based customization platform, the knitting program instructions of basic products comprising design files of the basic products and knitting programs for making the basic products;
generating a design file and an order of a new product in response to a customer designing the new product on the cloud-based customization platform based on the basic products and placing the order;
replacing the design file of the corresponding basic product with the design file of the new product to generate the knitting program for making the new product, and generating a working file executable by a knitting machine;
sending the order and the working file to an intelligent factory system or manufacturing execution system thereby transmitting the order and the working file to the knitting machine of a corresponding factory;
producing the new product by using the knitting machine according to the working file;
wherein, the design file includes size information, and a knitting structure;
the size information includes a lateral size and a longitudinal size; the lateral size is not arbitrary, and lateral pixels are consistent with a number of knitting needles to be used on the knitting machine; the longitudinal size is arbitrarily designed based on a length of the product; and
the knitting structure is indicated by color, the color represents a needle selection command on the knitting machine, and different needle selection commands form different knitted fabric effect.

* * * * *